United States Patent
White et al.

(10) Patent No.: US 8,966,388 B2
(45) Date of Patent: Feb. 24, 2015

(54) DYNAMIC CREATION OF PRODUCT STRUCTURE

(75) Inventors: Brent-Kaan William White, San Francisco, CA (US); Sachin Patel, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1379 days.

(21) Appl. No.: 12/198,318

(22) Filed: Aug. 26, 2008

(65) Prior Publication Data

US 2010/0058218 A1    Mar. 4, 2010

(51) Int. Cl.
*G06F 3/048* (2013.01)
*G06Q 10/06* (2012.01)

(52) U.S. Cl.
CPC ..................................... *G06Q 10/06* (2013.01)
USPC ............................ 715/771; 715/853; 715/854

(58) Field of Classification Search
CPC ... G06F 3/048; G06F 3/0481; G06F 3/04812; G06F 3/0482; G06Q 10/0875; G06Q 10/06; G06Q 10/08; G06Q 10/087
USPC ......................................... 715/854, 853, 771
See application file for complete search history.

(56) References Cited

U.S. PATENT DOCUMENTS

| | | | | | |
|---|---|---|---|---|---|
| 4,847,761 | A | * | 7/1989 | Ferriter et al. | 705/29 |
| 5,119,307 | A | * | 6/1992 | Blaha et al. | 700/107 |
| 5,815,395 | A | * | 9/1998 | Hart et al. | 700/110 |
| 6,192,373 | B1 | * | 2/2001 | Haegele | 1/1 |
| 6,343,291 | B1 | * | 1/2002 | Goldman | 707/802 |
| 6,480,857 | B1 | * | 11/2002 | Chandler | 707/792 |
| 2002/0091700 | A1 | * | 7/2002 | Steele et al. | 707/100 |
| 2002/0107892 | A1 | * | 8/2002 | Chittu et al. | 707/514 |
| 2003/0167213 | A1 | * | 9/2003 | Jammes et al. | 705/27 |
| 2003/0220853 | A1 | * | 11/2003 | Back et al. | 705/29 |
| 2006/0010172 | A1 | * | 1/2006 | Grigoriadis et al. | 707/200 |
| 2006/0277005 | A1 | * | 12/2006 | Walker et al. | 703/1 |

* cited by examiner

*Primary Examiner* — Weilun Lo
*Assistant Examiner* — Rashedul Hassan
(74) *Attorney, Agent, or Firm* — Kilpatrick Townsend & Stockton LLP

(57) ABSTRACT

Systems and method for dynamic creation of product structure using a graphical user interface (GUI) are disclosed. A method for dynamic creation of products structures may include displaying information specifying a set of product items using the GUI. Input can be received via the GUI. The input may be indicative of one or more product levels within a product structure. A user may indent or otherwise manipulate the set of product items into one or more product levels. A product structure can then be generated based on the one or more product levels. In some embodiments, display of the set of product items can be updated to reflect the product structure.

25 Claims, 11 Drawing Sheets

DYNAMIC CREATION OF PRODUCT STRUCTURE

BACKGROUND OF THE INVENTION

Embodiments of the present invention generally relate to product structures and more specifically to dynamic creation of product structure.

Currently, when product managers or other responsible parties are creating an item that has children (such as a car that is composed of an engine, drive train, transmission, etc.) the end user is required to define each level of the structure one at a time. For instance, a user may first define top level assemblies. The user then may add items at these levels that may up the top level assemblies. The user then may define the next levels, and add items to those levels, and so forth.

Accordingly, what is desired is to solve problems relating to the creation of product structures, some of which may be discussed herein. Additionally, what is desired is to reduce drawbacks related to product definition, some of which may be discussed herein.

BRIEF SUMMARY OF THE INVENTION

Embodiments of the present invention generally relate to product structures and more specifically to dynamic creation of product structure. In one embodiment, a method for dynamic creation of product structure using a graphical user interface (GUI) includes displaying information specifying a set of product items using the GUI. Input can be received via the GUI. The input may be indicative of one or more product levels within a product structure. A user may indent or otherwise manipulate the set of product items into one or more product levels. A product structure can then be generated based on the one or more product levels. In some embodiments, display of the set of product items can be updated to reflect the product structure.

In some embodiments, information indicative of a displacement of a first product item relative to a second product item may be received to create the product structure. A first product level in the product structure may be generated based on the indent or displacement. The first product item may also be associated with the new first product level. In one embodiment, a parent-child relationship can be simultaneously created between the first product item at the first product level and a second product item at a second product level. In yet another embodiment, a peer relationship may be created between the first product item at the first product level and a second product item at the first product level.

In further embodiments, placeholders may be received. A placeholder may designate a location within one or more levels of product structures for items. The placeholder may be associated with at least one of the one or more product levels such that the placeholder may be updated in the product structure with information associated with a product item subsequent to generating the product structure. In still further embodiments, a set of product items may be received in response to search criteria. The product structure may be updated in response to identifying relationships of one or more product items in the set of product items.

In one embodiment, a computer readable medium can be configured to store a set of code modules which when executed by a processor of a computer system become operational with the processor for dynamic creation of product structure using a graphical user interface (GUI). The computer readable medium may include code for displaying information specifying a set of product items using the GUI, code for receiving input via the GUI indicative of one or more product levels within a product structure, code for generating the product structure based on the one or more product levels, and code for updating display of the set of product items to reflect the product structure.

In another embodiment, a system for dynamic creation of product structure may include an output device and a processor. The output device can be configured to display a graphical user interface (GUI). The processor may be configured to display information specifying a set of product items using the GUI, receive input via the GUI indicative of one or more product levels within a product structure, generate the product structure based on the one or more product levels, and update display of the set of product items to reflect the product structure.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

FIGS. 3A and 3B are screenshots of an interface for dynamically creating product structures in one embodiment according to the present invention;

FIG. 4 is a screenshot of an interface for interacting with product structures in one embodiment according to the present invention;

FIG. 5 is a screenshot of an interface for viewing attributes details of product items in one embodiment according to the present invention;

DETAILED DESCRIPTION OF THE INVENTION

Figure 1:
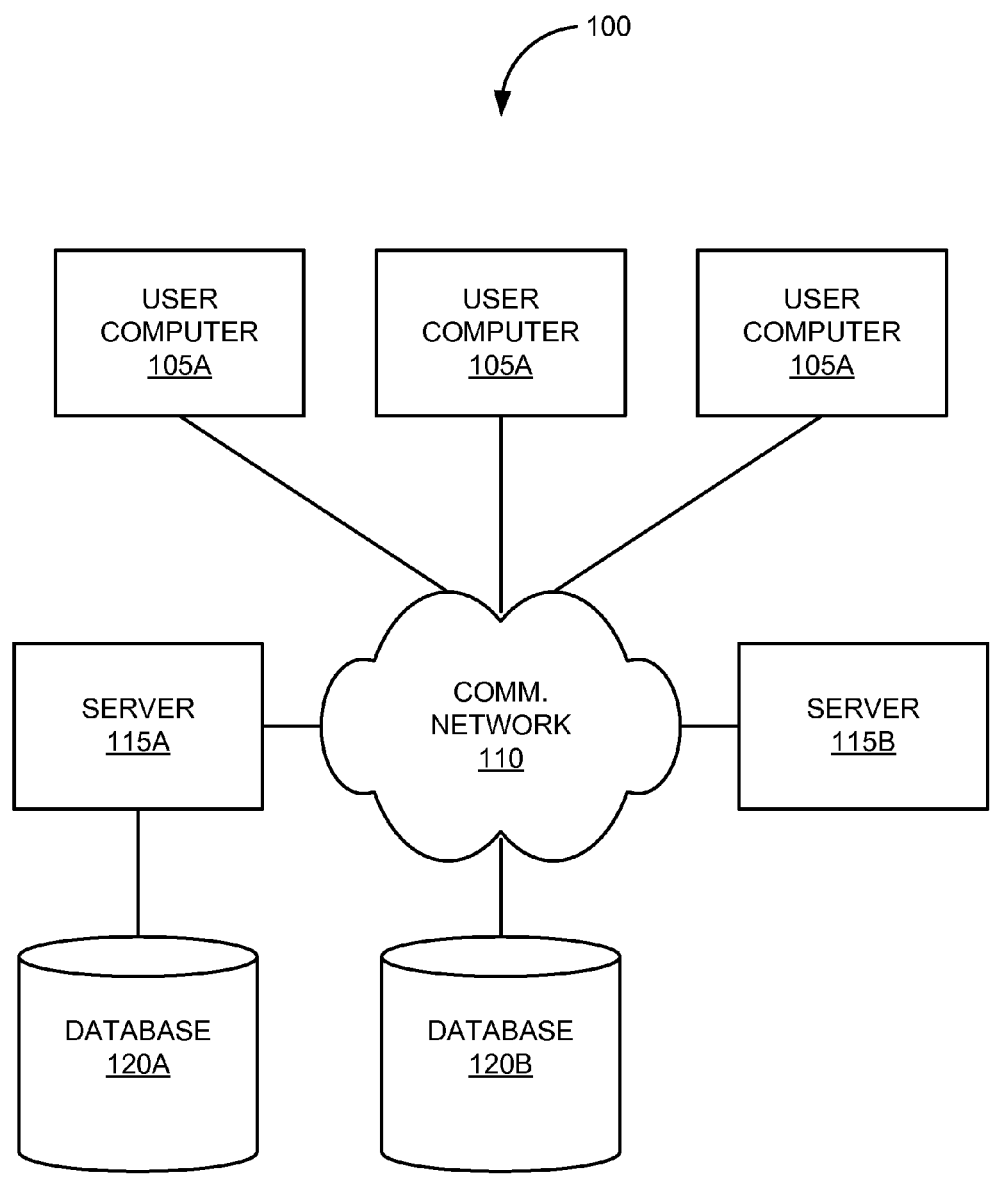
FIG. 1 is a simplified illustration of a system that may incorporate an embodiment of the present invention.

FIG. 1 is a simplified illustration of system 100 that may incorporate an embodiment of the present invention. FIG. 100 is merely illustrative of an embodiment incorporating the present invention and does not limit the scope of the invention as recited in the claims. One of ordinary skill in the art would recognize other variations, modifications, and alternatives.

In one embodiment, system 100 includes one or more user computers 105 (e.g., computers 105A, 105B, and 105C). User computers 105 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 105 can also have any of a variety of applications, including one or more applications configured to perform methods of the invention, as well as one or more office applications, database client and/or server applications, and web browser applications.

Alternatively, user computers 105 can be any other electronic device, such as a thin-client computer, Internet-enabled mobile telephone, and/or personal digital assistant, capable of communicating via a network (e.g., communications network 110 described below) and/or displaying and navigating web pages or other types of electronic documents. Although the exemplary system 100 is shown with three user computers, any number of user computers or devices can be supported.

Certain embodiments of the invention operate in a networked environment, which can include communications network 110. Communications network 110 can be any type of network familiar to those skilled in the art that can support data communications using any of a variety of commercially-available protocols, including without limitation TCP/IP, SNA, IPX, AppleTalk, and the like. Merely by way of example, communications network 110 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 115 (e.g., computers 115A and 115B). Each of server computers 115 may be configured with an operating system including without limitation any of those discussed above, as well as any commercially-available server operating systems. Each of server computers 115 may also be running one or more applications, which can be configured to provide services to one or more clients (e.g., user computers 105) and/or other servers (e.g., server computers 115).

Merely by way of example, one of server computers 115 may be a web server, which can be used, merely by way of example, to process requests for web pages or other electronic documents from user computers 105. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 105 to perform methods of the invention.

Server computers 115, in some embodiments, might include one or more file and or/application servers, which can include one or more applications accessible by a client running on one or more of user computers 105 and/or other server computers 115. Merely by way of example, one or more of server computers 115 can be one or more general purpose computers capable of executing programs or scripts in response to user computers 105 and/or other server computers 115, including without limitation web applications (which might, in some cases, be configured to perform methods of the invention).

Merely by way of example, a web application can be implemented as one or more scripts or programs written in any programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from database clients running on one of user computers 105 and/or another of server computer 115.

In some embodiments, an application server can create web pages dynamically for displaying the information in accordance with embodiments of the invention. Data provided by an application server may be formatted as web pages (comprising HTML, XML, Javascript, AJAX, etc., for example) and/or may be forwarded to one of user computers 105 via a web server (as described above, for example). Similarly, a web server might receive web page requests and/or input data from one of user computers 105 and/or forward the web page requests and/or input data to an application server.

In accordance with further embodiments, one or more of server computers 115 can function as a file server and/or can include one or more of the files necessary to implement methods of the invention incorporated by an application running on one of user computers 105 and/or another of servers 115. Alternatively, as those skilled in the art will appreciate, a file server can include all necessary files, allowing such an application to be invoked remotely by one or more of user computers 105 and/or server computers 115. It should be noted that the functions described with respect to various servers herein (e.g., application server, database server, web server, file server, etc.) can be performed by a single server and/or a plurality of specialized servers, depending on implementation-specific needs and parameters.

In certain embodiments, system 100 can include one or more databases 120 (e.g., databases 120A and 120B). The location of the database(s) 120 is discretionary: merely by way of example, database 120A might reside on a storage medium local to (and/or resident in) server computer 115A (and/or one or more of user computers 105). Alternatively, database 120B can be remote from any or all of user computers 105 and server computers 115, so long as it can be in communication (e.g., via communications network 110) with one or more of these. In a particular set of embodiments, databases 120 can reside in a storage-area network ("SAN") familiar to those skilled in the art. (Likewise, any necessary files for performing the functions attributed to user computers 105 and server computers 115 can be stored locally on the respective computer and/or remotely, as appropriate). In one set of embodiments, one or more of databases 120 can be a relational database, such as an Oracle™ database, that is adapted to store, update, and retrieve data in response to SQL-formatted commands. Databases 120 might be controlled and/or maintained by a database server, as described above, for example.

In various embodiments, a user or product manager may interact with a graphical user interface (GUI) to quickly and flexibly create product structures. The user or product manager may interact with a flat list of product items within the GUI to establish one or more product levels within a product structure. This may by readily accomplished by indenting or otherwise displacing product items within the GUI. For example, a first product item can be indented within a list. In response to indenting the first product item, a new product level may be dynamically created and one or more relationships may be constructed. A second product item may be the root of the new product level, and the first product item may become a child of the second product item. Accordingly, users can more rapidly develop product structures using on-the-fly techniques for constructing a product structure using visual elements for indents and the like.

Figure 2A:
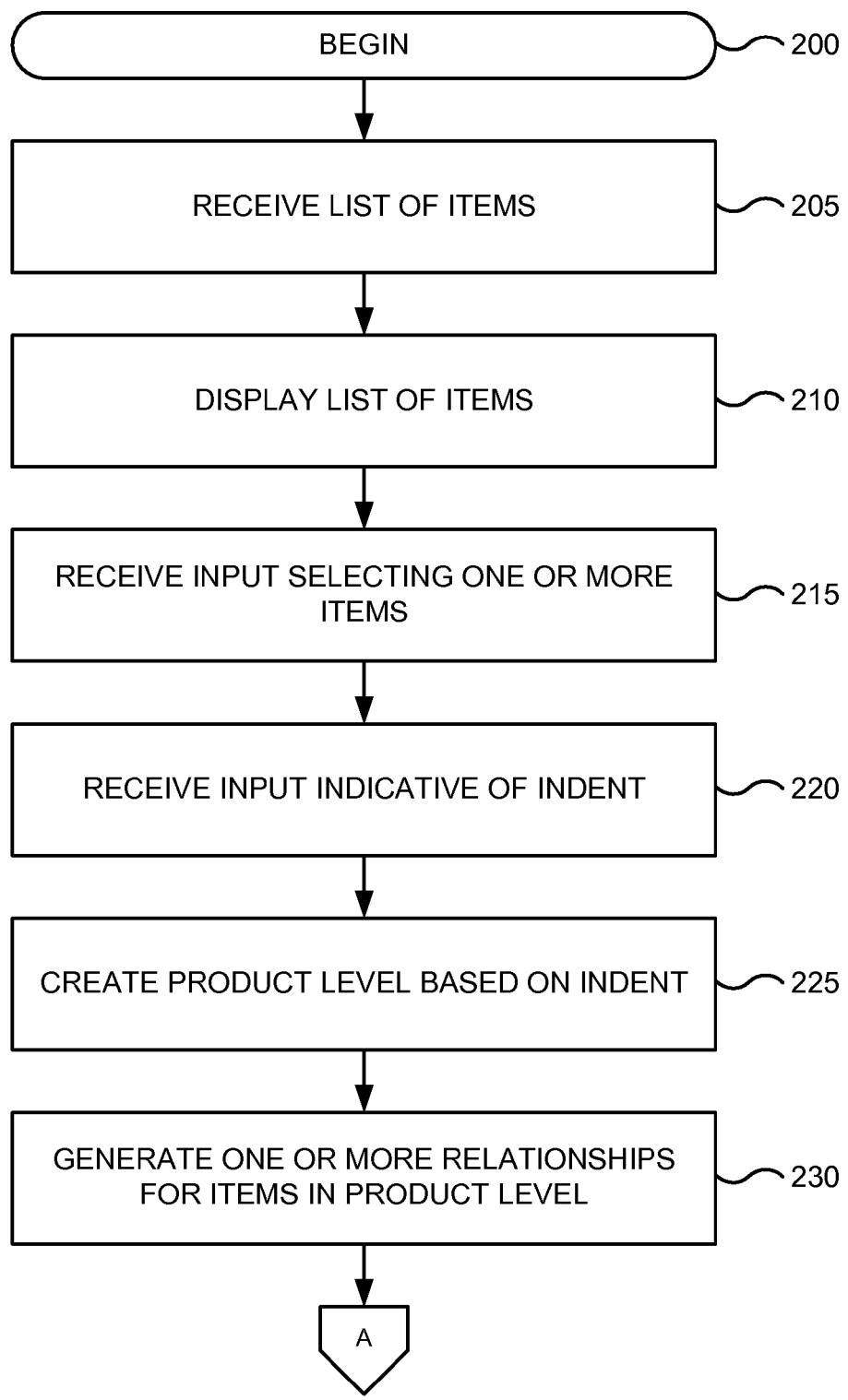
FIGS. 2A and 2B are a flowchart of a method for dynamic creation of product structures in one embodiment according to the present invention.
Figure 2B:
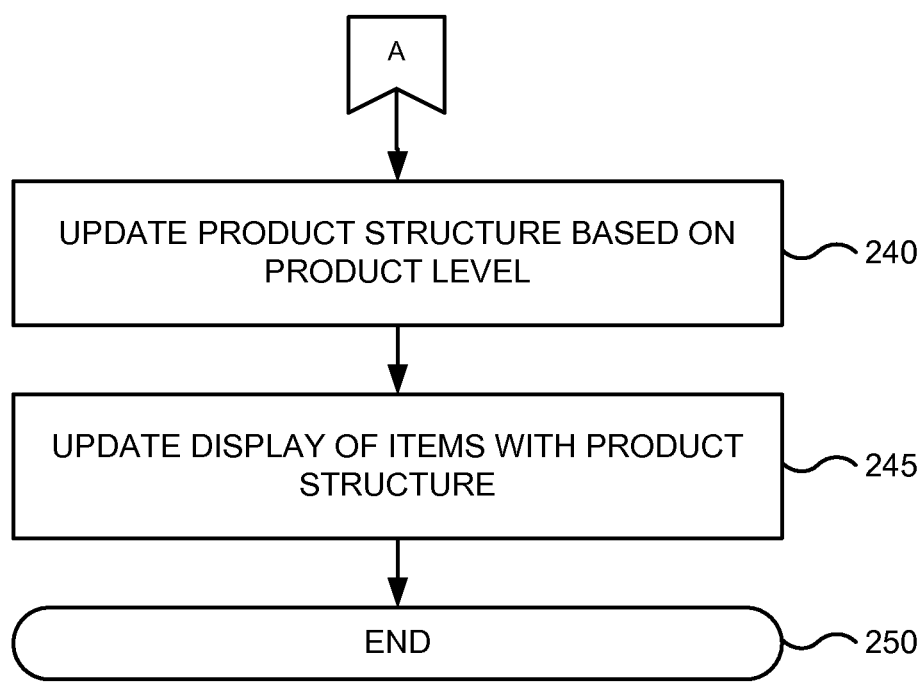

FIGS. 2A and 2B are a flowchart of a method for dynamic creation of product structures in one embodiment according to the present invention. The processing depicted in FIGS. 2A and 2B may be performed by software modules (e.g., instructions or code) executed by a processor of a computer system, by hardware modules of an electronic device, or combinations thereof. FIG. 2A begins in step 200.

In step 205, a list of items is received. The list may be read from a file, stream, or other data source. In various embodiments, a flat list of product items may be imported from a database. In some embodiments, the list of items may or may not include information specifying product structure or relationships between one or more product items.

Figures 3A, 3B:
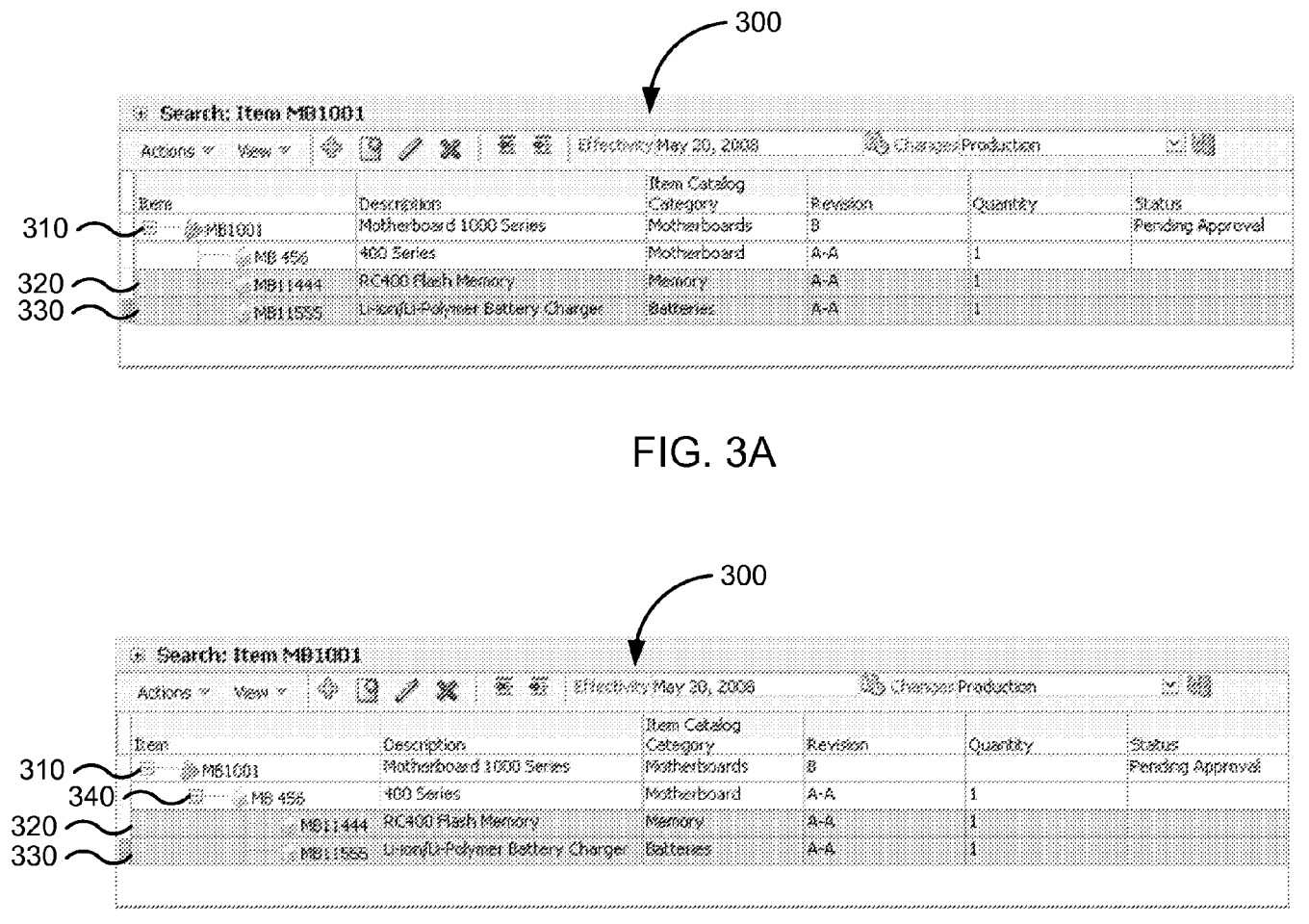

In step 210, the list of items is displayed. In various embodiments, the list of items may be displayed using a graphical user interface (GUI) that includes GUI elements configured for manipulating product structure. FIG. 3A is a screenshot of interface 300 for interacting with product structures in one embodiment according to the present invention. In this example, interface 300 display information associated with one or more product items (e.g., MB1001, MB 456, MB11444, MB155). In this example, the product structure of item 310 includes several additional product items as children, including items 320 and 330.

In step 215, input is received selecting one or more items. For example, a user or product manager responsible for creating the product structure of item 310 in FIG. 3A may select items 320 and 330 (shown as highlighted or shaded). In step 220, input is received indicative of an indent. For example, after selecting items 320 and 330, the user or product manager may select one or more GUI elements indicative of an indent, click a designated mouse button, or press one or more keys on a keyboard to represented an indent or other change in the GUI position of items 320 and 330.

In step 225, a product level is created based on the indent. In step 230, one or more relationships for the one or more selected items are generated. Some examples of relationships are parent-child, group and sub-group, peer relationships, or the like. Referring to FIG. 2B, in step 240, the product structure is updated based on the new product level. In step 245, display of the items is updated with the product structure.

For example, as shown in FIG. 3B, a new product level is created for item 340. Items 320 and 330 are shifted to the right to visually represent relationships of items 320 and 330 to item 340 at the new product level in the product structure. Accordingly, the user or product manager can quickly create product structures from flat lists of product items by using indents to create both product levels and relationships between product items. FIG. 2B ends in step 250.

Figure 4:
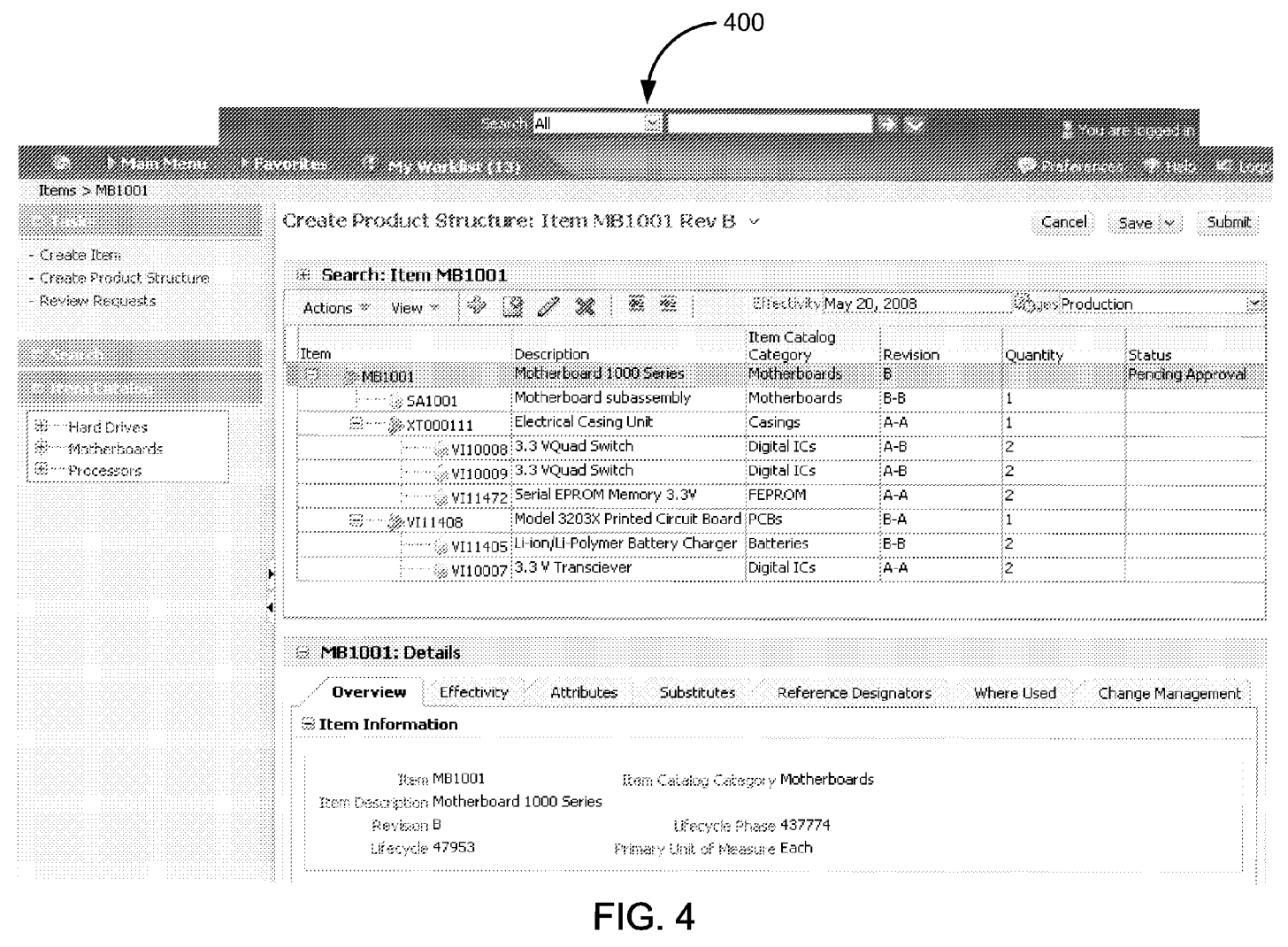

FIG. 4 is a screenshot of interface 400 for interacting with product structures in one embodiment according to the present invention. In this example, interface 400 can display information associated with product structures, such as product items that are included in a given product structure, the different product levels that may be found within the product structure, and the relationships between product items at the same or different product levels. In various embodiments, a user or product manager may interact with interface 400 to view product structure information using one or more tabs, such as "Overview," "Attributes," "Where Used," or the like.

Figure 5:
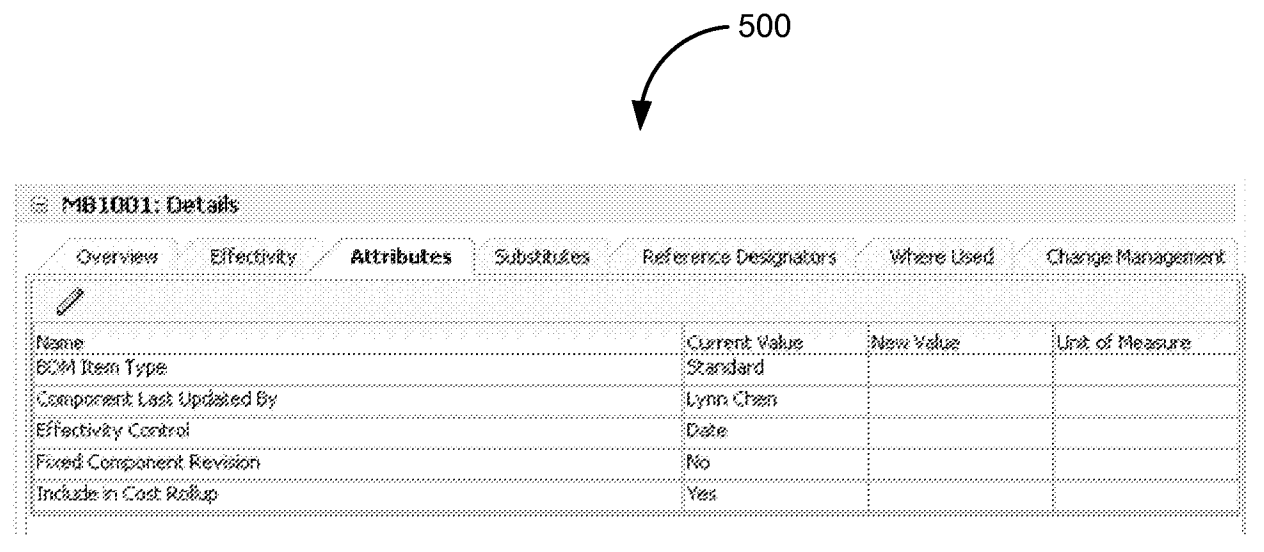

FIG. 5 is a screenshot of interface 500 for viewing attribute details of product items in one embodiment according to the present invention. Interface 500 may include one or more GUI elements for displaying textual and/or visual information about attributes of a selected product structure, product level, product item, or the like. A user or product manager may interact with interface 500 to add, remove, or modify one or more attributes of a selected product structure, product level, product item, or the like.

Figure 6:
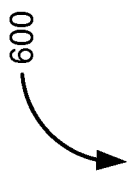
FIG. 6 is a screenshot of an interface for viewing where a product item is used in product structures in one embodiment according to the present invention.

FIG. 6 is a screenshot of interface 600 for viewing where a product item is used in product structures in one embodiment according to the present invention. Interface 600 may include one or more GUI elements for displaying textual and/or visual information about where a selected product structure, product level, product item, or the like, is found. For example, instances of the same product item may be found in different product levels of the same product structure or in different product structures.

Figure 7:
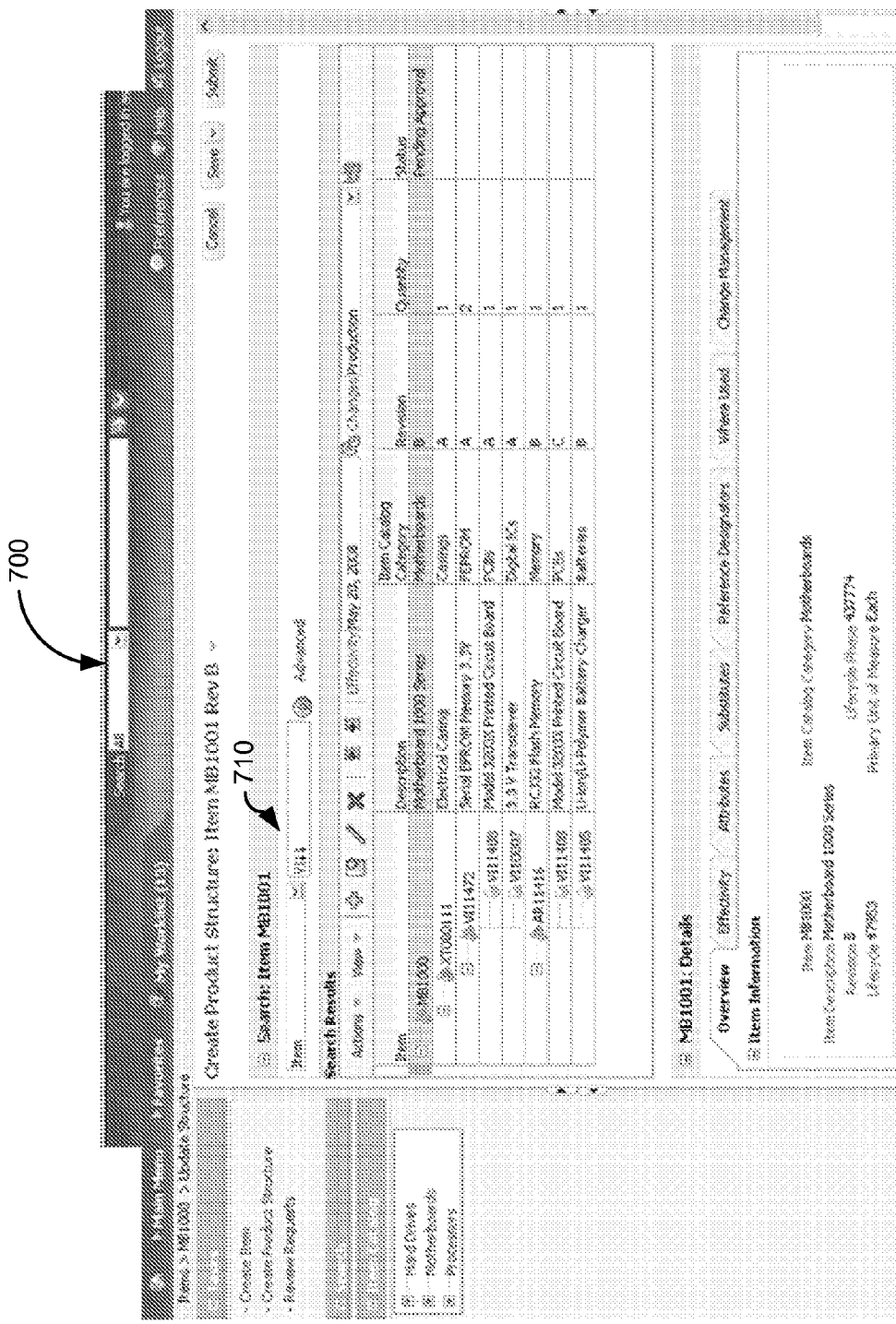
FIG. 7 is a screenshot of an interface for searching an item within a product structure in one embodiment according to the present invention.

FIG. 7 is a screenshot of interface 700 for searching product structures in one embodiment according to the present invention. In various embodiments, a listing of all product items within a product structure can include several hundreds to thousands of product items. Interface 700 may include one or more GUI elements 710 for entering search terms and for displaying textual and/or visual information about product items, product levels, or the like, that match the search terms or otherwise meet or satisfy a search criteria.

Figure 8:
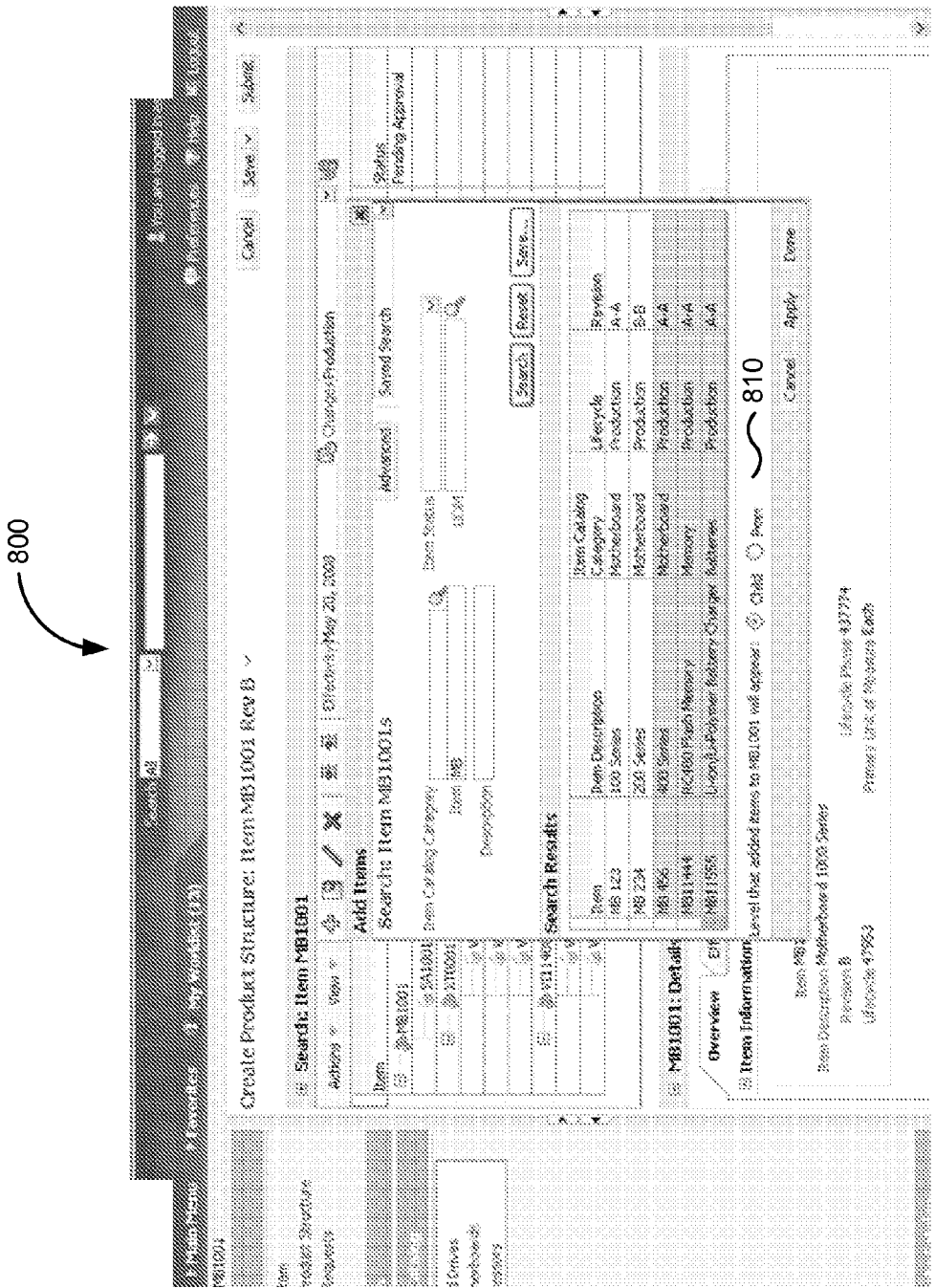
FIG. 8 is a screenshot of an interface for adding an item to a product structure in one embodiment according to the present invention.

In various embodiments, a user or product manager may perform a search for one or more product items. Upon receiving the search results, the user or product manager may interface with interface 700 to dynamically create the product structure using item in the search results. FIG. 8 is a screenshot of interface 800 for adding an item to a product structure in one embodiment according to the present invention. In this example, a user or product manager can search for items that include "MB." Items that match or satisfy the search criteria may be displayed in interface 800.

Interface 800 may include one or more GUI elements 810 for selecting the type of relationship of items when added to a product level. The user or product manager may select the items, and select whether the items are peers or children of another item. Accordingly, product levels of a product structure may be dynamically constructed on-the-fly at any point within a listing of product items. A user or product manager can dynamically create product levels and product item relationships by using one action, such as moving product items using an indent to create both the product structure at the level and product hierarchy of items within the new level.

A user or product manager may not have access to the complete list of product items when creating a product structure. In various embodiments, placeholders for items may be inserted to allow the user or product manager to dynamically create the product structure and allow information for missing product items to be subsequently added.

Figure 9:
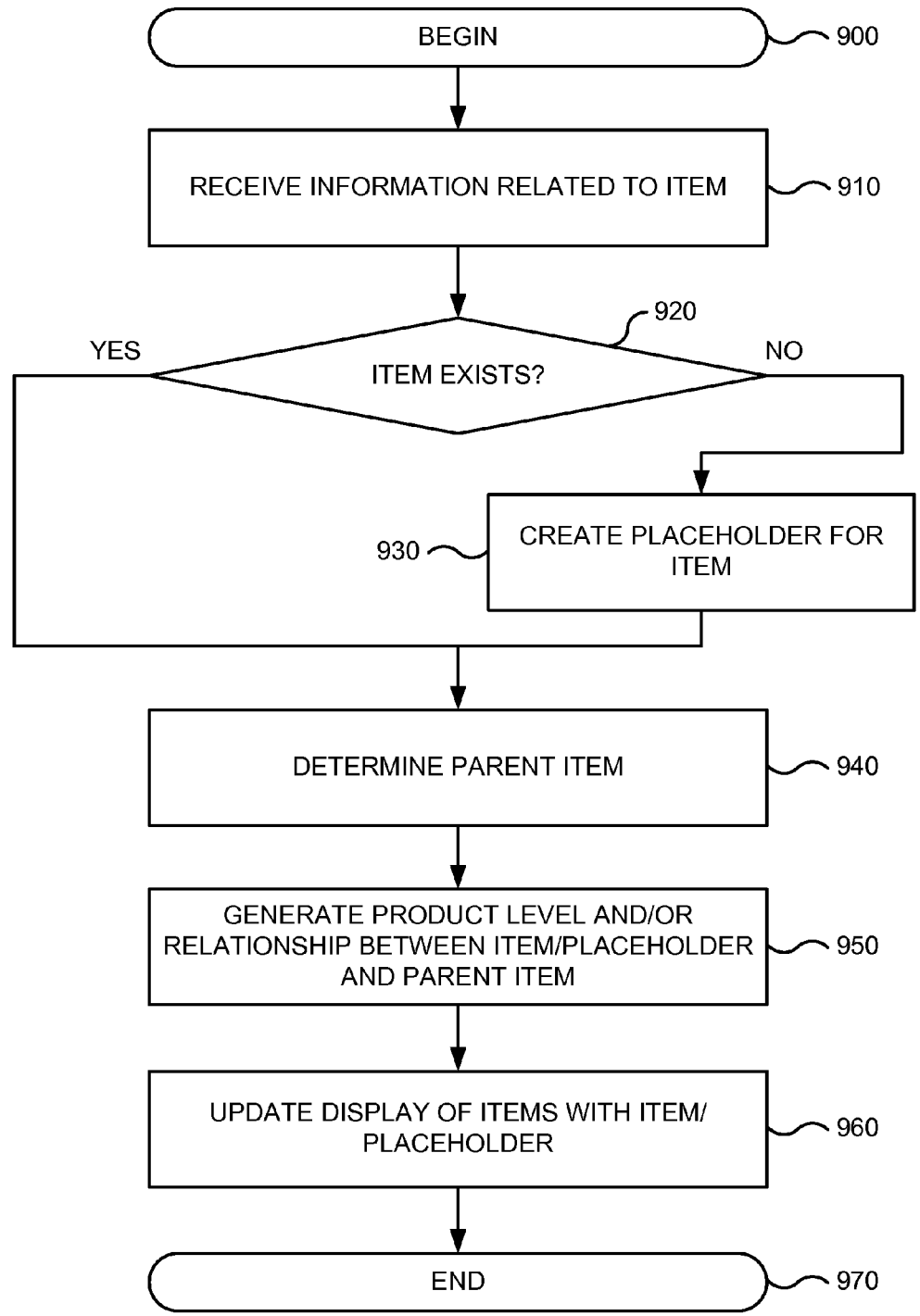
FIG. 9 is a flowchart of a method for dynamically creating product structures using placeholders in one embodiment according to the present invention.

FIG. 9 is a flowchart of a method for dynamically creating product structures using placeholders in one embodiment according to the present invention. FIG. 9 begins in step 900.

In step 910, information related to an item is received. For example, a user or product manager may perform a search for an item using interface 800. In step 920, a determination is made whether the item exists in a list of products. If the item does not exist, in step 930, a placeholder is created for the item.

In various embodiments, the placeholder may include information related to the item. The placeholder may include information that enables a user or product manager to manually perform an association between the placeholder and data for the actual item. In some embodiments, the placeholder may include information that enables information associated with the item to be automatically inserted into the product structure.

After creating a placeholder or alternatively if the item exists in the list of product items, in step 940, a parent of the item or item placeholder is determined. In step 950, a product level is generated based on the item or item placholder, and/or relationships between the item or item placeholder and the parent item. In step 960, display of the item or item placeholder is then updated. FIG. 9 ends in step 970.

In various embodiments, a user or product manager can create product structures from flat lists of product items faster and more intuitively using a dynamic creation technique. Working with a set of all product items, or using placeholders, the user or product manager can arrange items into one or more levels of product structures. The user or product manager may work with different product levels simultaneously and intuitively to create dynamic relationships between product items in the product structure.

Figure 10:
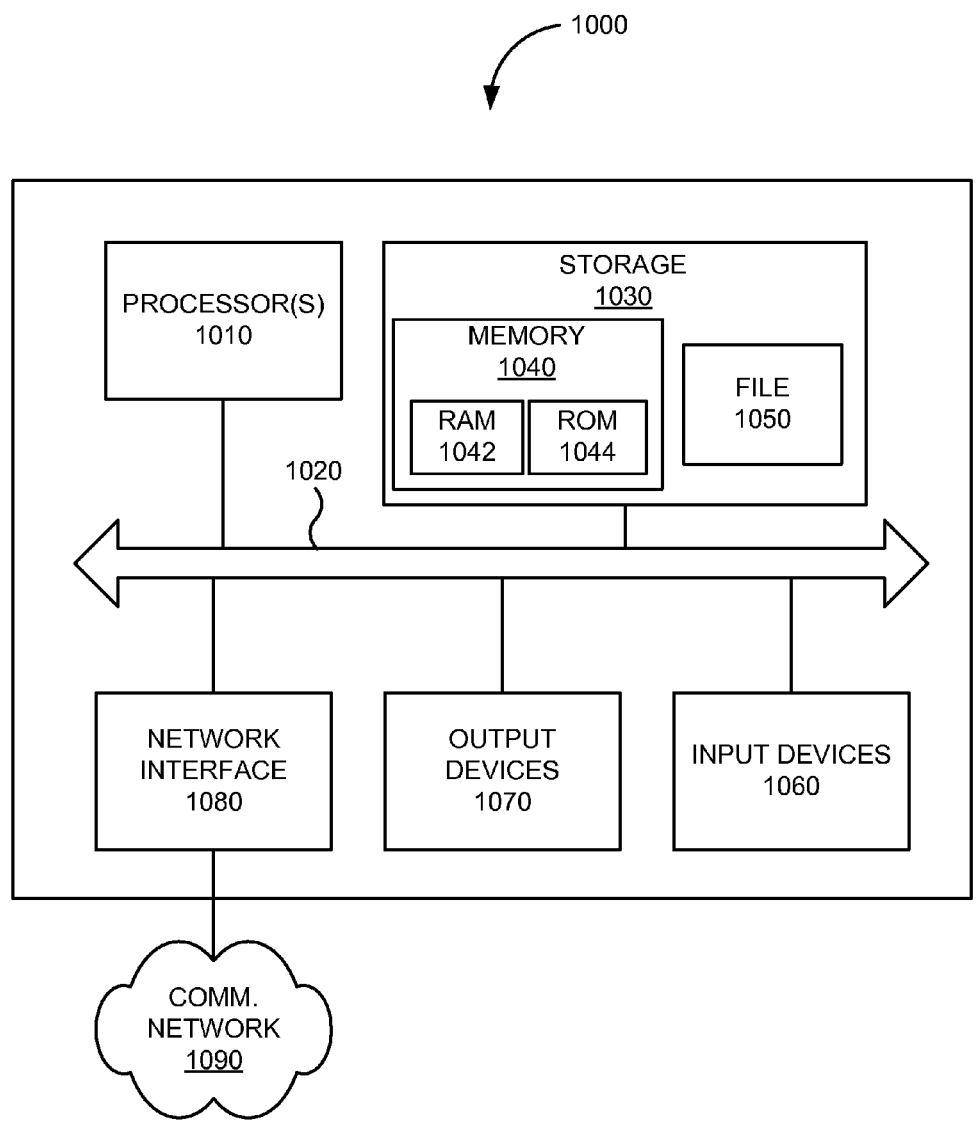
FIG. 10 is a simplified block diagram of a computer system that may be used to practice embodiments of the present invention.

FIG. 10 is a simplified block diagram of computer system 1000 that may be used to practice embodiments of the present invention. As shown in FIG. 10, computer system 1000 includes processor 1010 that communicates with a number of peripheral devices via bus subsystem 1020. These peripheral devices may include storage subsystem 1030, comprising memory subsystem 1040 and file storage subsystem 1050, input devices 1060, output devices 1070, and network interface subsystem 1080.

Bus subsystem 1020 provides a mechanism for letting the various components and subsystems of computer system 1000 communicate with each other as intended. Although bus subsystem 1020 is shown schematically as a single bus, alternative embodiments of the bus subsystem may utilize multiple busses.

Storage subsystem 1030 may be configured to store the basic programming and data constructs that provide the functionality of the present invention. Software (code modules or instructions) that provides the functionality of the present invention may be stored in storage subsystem 1030. These software modules or instructions may be executed by processor(s) 1010. Storage subsystem 1030 may also provide a repository for storing data used in accordance with the present invention. Storage subsystem 1030 may comprise memory subsystem 1040 and file/disk storage subsystem 1050.

Memory subsystem 1040 may include a number of memories including a main random access memory (RAM) 1042 for storage of instructions and data during program execution and a read only memory (ROM) 1044 in which fixed instructions are stored. File storage subsystem 1050 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Input devices 1060 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 1000.

Output devices 1070 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1000.

Network interface subsystem 1080 provides an interface to other computer systems, devices, and networks, such as communications network 1090. Network interface subsystem 1080 serves as an interface for receiving data from and transmitting data to other systems from computer system 1000. Some examples of communications network 1090 are private networks, public networks, leased lines, the Internet, Ethernet networks, token ring networks, fiber optic networks, and the like.

Computer system 1000 can be of various types including a personal computer, a portable computer, a workstation, a network computer, a mainframe, a kiosk, or any other data processing system. Due to the ever-changing nature of computers and networks, the description of computer system 1000 depicted in FIG. 10 is intended only as a specific example for purposes of illustrating the preferred embodiment of the computer system. Many other configurations having more or fewer components than the system depicted in FIG. 10 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method for interactively creating product structures using a graphical user interface, the method comprising:

receiving, at one or more computer systems, search results providing a product component list in response to a user searching via the graphical user interface for one or more product components within a product structure of a product, the product component list having a plurality of product components associated with the product, each product component in the plurality of product components satisfying search criteria provided via the graphical user interface;

receiving, at the one or more computer system, input via the graphical user interface indicative of a change in position of a first product component in the product component list within a display of the search results relative to a second product component in the product component list within the display of the product component list;

generating, with one or more processors associated with the one or more computer systems, a product level that includes the first product component and a relationship between the first product component and the second product component simultaneously based on the change in the position of the first component in the product component list within the display of the search results; and updating, with the one or more processors associated with the one or more computer systems, the product structure for the product based on the generated product level that includes the first product component and a set of relationships associated with the plurality of product components that includes the generated relationship between the first product component and the second product component.

2. The method of claim 1 wherein receiving, at the one or more computer system, the input via the graphical user interface indicative of the change in the position of the first product component in the product component list within the display of the search results relative to the second product component in the product component list comprises receiving selection of an element of the graphical user interface configured to displace the first product component relative to the second product component.

3. The method of claim 1 wherein receiving, at the one or more computer system, the input via the graphical user interface indicative of the change in the position of the first product component in the product component list within the display of the search results relative to the second product component in the product component list comprises receiving selection of a button configured to indent the first product component to the left or right.

4. The method of claim 1 wherein generating the product level that includes the first product component in the product component list comprises generating a new product level in the product structure of the product.

5. The method of claim 1 wherein generating the relationship between the first product component and the second product component comprises generating a parent-child relationship between the first product component and the second product component at another product level.

6. The method of claim 1 wherein generating the relationship between the first product component and the second product component comprises generating a peer relationship between the first product component and the second product component.

7. The method of claim 1 further comprising:
receiving a placeholder; and
associating the placeholder with at least one of one or more product levels in the product structure of the product.

8. The method of claim 7 further comprising updating the placeholder in the product structure with information associated with a product component.

9. The method of claim 1 further comprising:
receiving a list of product components in response to the user searching via the graphical user interface for product components to add to the product structure, each product component in the list of product components satisfying search criteria provided via the graphical user interface; and
updating the product structure for the product in response to receiving input via the graphical user interface identifying one of a plurality of relationships to be used between one or more product components in the list of product components and one or more product components in the product component list presented together with search results including the list of product components.

10. A non-transitory computer readable medium storing a set of code modules which when executed by a processor of a computer system become operational with the processor for creating product structures using a graphical user interface, the non-transitory computer readable medium comprising:

code for receiving search results providing a product component list in response to a user searching via the graphical user interface for one or more product components within a product structure of a product, the product component list having a plurality of product components associated with the product, each product component in the plurality of product components satisfying search criteria provided via the graphical user interface;

code for receiving input via the graphical user interface indicative of a change in position of a first product component in the product component list within a display of the search results relative to a second product component in the product component list within the display of the product component list;

code for generating a product level that includes the first product component and a relationship between the first product component and the second product component simultaneously based on the change in the position of the first component in the product component list within the display of the search results; and code for updating the product structure for the product based on the generated product level that includes the first product component and a set of relationships associated with the plurality of product components that includes the generated relationship between the first product component and the second product component.

11. The non-transitory computer-readable medium of claim 10 wherein the code for receiving the input via the graphical user interface indicative of the change in the position of the first product component in the product component list within the display of the search results relative to the second product component in the product component list comprises code for receiving selection of an element of the graphical user interface configured to displace the first product component relative to the second product component.

12. The non-transitory computer-readable medium of claim 10 wherein the code for receiving the input via the graphical user interface indicative of the change in the position of the first product component in the product component list within the display of the search results relative to the second product component in the product component list comprises code for receiving selection of a button configured to indent the first product component to the left or right.

13. The non-transitory computer-readable medium of claim 10 wherein the code for generating the product level that includes the first product component in the product component list comprises code for generating a new product level in the product structure of the product.

14. The non-transitory computer-readable medium of claim 10 wherein the code for the relationship between the first product component and the second product component comprises code for generating a parent-child relationship between the first product component and the second product component at another product level.

15. The non-transitory computer-readable medium of claim 10 wherein the code for generating the relationship between the first product component and the second product component comprises code for generating a peer relationship between the first product component and the second product component.

16. The non-transitory computer-readable medium of claim 10 further comprising:
   code for receiving a placeholder; and
   code for associating the placeholder with at least one of one or more product levels in the product structure of the product.

17. The non-transitory computer-readable medium of claim 16 further comprising code for updating the placeholder in the product structure with information associated with a product component.

18. The non-transitory computer-readable medium of claim 10 further comprising:
   code for receiving a list of product components in response to the user searching via the graphical user interface for product components to add to the product structure, each product component in the list of product components satisfying search criteria provided via the graphical user interface; and
   code for updating the product structure for the product in response to receiving input via the graphical user interface identifying one of a plurality of relationships to be used between one or more product components in the list of product components and one or more product components in the product component list presented via the graphical user interface.

19. A system comprising:
   a memory configured to store a set of instructions; and
   a processor coupled to the memory and configured to execute the set of instructions to:
      receive search results providing a product component list in response to a user searching via a graphical user interface for one or more product components within a product structure of a product, the product component list having a plurality of product components associated with the product, each product component in the plurality of product components satisfying search criteria provided via the graphical user interface;
      receive input via the graphical user interface indicative of a change in position of a first product component in the product component list within a display of the search results relative to a second product component in the product component list within the display of the product component list;
      generate a product level that includes the first product component and a relationship between the first product component and the second product component simultaneously based on the change in the position of the first component in the product component list within the display of the search results; and
      update the product structure for the product based on the generated product level that includes the first product component and a set of relationships associated with the plurality of product components that includes the generated relationship between the first product component and the second product component.

20. The system of claim 19 wherein to generate the product level the processor is further configured to:
   generate a new product level that includes the first product component in the product component list.

21. The system of claim 19 wherein to generate the relationship between the first product component and the second product component the processor is further configured to:
   generate a parent-child relationship between the first product component and the second product component at another product level.

22. The system of claim 19 wherein to generate the relationship between the first product component and the second product component the processor is further configured to:
   generate a peer relationship between the first product component and the second product component.

23. The system of claim 19 wherein the processor is further configured to:
   receive a placeholder; and
   associate the placeholder with at least one of one or more product levels in the product structure of the product.

24. The system of claim 19 wherein the processor is further configured to update the placeholder in the product structure with information associated with a product component.

25. The system of claim 23 wherein the processor is further configured to:
   receive a list of product components in response to the user searching via the graphical user interface for product components to add to the product structure, each product component in the list of product components satisfying search criteria provided via the graphical user interface; and
   update the product structure for the product in response to receiving input via the graphical user interface identifying one of a plurality of relationships to be used between one or more product components in the list of product components and one or more product components in the product component list presented via the graphical user interface.

* * * * *

UNITED STATES PATENT AND TRADEMARK OFFICE
CERTIFICATE OF CORRECTION

| | | |
|---|---|---|
| PATENT NO. | : 8,966,388 B2 | |
| APPLICATION NO. | : 12/198318 | |
| DATED | : February 24, 2015 | |
| INVENTOR(S) | : White et al. | |

It is certified that error appears in the above-identified patent and that said Letters Patent is hereby corrected as shown below:

In the specification

In column 4, line 66, delete "may by" and insert -- may be --, therefor.

In column 7, line 10, delete "placholder," and insert -- placeholder, --, therefor.

In the claims

In column 12, line 31, in Claim 24, delete "19" and insert -- 23 --, therefor.

Signed and Sealed this
Twentieth Day of October, 2015

Michelle K. Lee
*Director of the United States Patent and Trademark Office*